(12) United States Patent
Kamata et al.

(10) Patent No.: US 10,141,090 B2
(45) Date of Patent: Nov. 27, 2018

(54) RESIN COMPOSITION, PASTE FOR FORMING A VARISTOR ELEMENT, AND VARISTOR ELEMENT

(71) Applicant: NAMICS CORPORATION, Niigata-shi, Niigata (JP)

(72) Inventors: Yoshitaka Kamata, Niigata (JP); Pawel Czubarow, Wellesley, MA (US); Toshiyuki Sato, Niigata (JP); Takayuki Fujita, Niigata (JP)

(73) Assignee: NAMICS CORPORATION, Niigata-shi, Niigata (JP)

( * ) Notice: Subject to any disclaimer, the term of this patent is extended or adjusted under 35 U.S.C. 154(b) by 0 days.

(21) Appl. No.: 15/860,136

(22) Filed: Jan. 2, 2018

(65) Prior Publication Data

US 2018/0197663 A1   Jul. 12, 2018

Related U.S. Application Data

(60) Provisional application No. 62/443,340, filed on Jan. 6, 2017.

(51) Int. Cl.
*H01C 7/105* (2006.01)
*C08L 63/00* (2006.01)

(52) U.S. Cl.
CPC .............. *H01C 7/105* (2013.01); *C08L 63/00* (2013.01)

(58) Field of Classification Search
CPC ................................ H01C 7/105; C08L 63/00
USPC .......................................................... 338/21
See application file for complete search history.

(56) References Cited

U.S. PATENT DOCUMENTS

| | | | |
|---|---|---|---|
| 6,797,145 B2 | 9/2004 | Kosowsky | |
| 7,446,030 B2 | 11/2008 | Kosowsky | |
| 7,695,644 B2 | 4/2010 | Kosowsky et al. | |
| 7,825,491 B2 | 11/2010 | Kosowsky | |
| 7,968,014 B2 | 6/2011 | Kosowsky et al. | |
| 9,208,930 B2 | 12/2015 | Kosowsky et al. | |
| 2008/0029405 A1 | 2/2008 | Kosowsky et al. | |
| 2008/0032049 A1 | 2/2008 | Kosowsky et al. | |
| 2008/0035370 A1* | 2/2008 | Kosowsky | B82Y 10/00 174/257 |
| 2008/0073114 A1 | 3/2008 | Kosowsky et al. | |
| 2010/0038121 A1 | 2/2010 | Kosowsky | |
| 2010/0264224 A1 | 10/2010 | Kosowsky | |
| 2012/0172495 A1* | 7/2012 | Czubarow | C08G 59/306 523/456 |
| 2012/0195018 A1 | 8/2012 | Kosowsky | |
| 2012/0211773 A1 | 8/2012 | Fleming et al. | |

FOREIGN PATENT DOCUMENTS

| | | |
|---|---|---|
| EP | 2054896 B1 | 6/2012 |
| EP | 2054897 B1 | 10/2012 |
| JP | 2012504870 A | 2/2012 |
| JP | 2013504684 A | 2/2013 |

(Continued)

*Primary Examiner* — Kyung Lee
*Assistant Examiner* — Iman Malakooti
(74) *Attorney, Agent, or Firm* — Holtz, Holtz & Volek PC

(57) ABSTRACT

A resin composition which includes (A) an epoxy resin, (B) a curing agent, and (C) carbon nanotubes, wherein the carbon nanotubes contain therein semiconducting single-walled carbon nanotubes in an amount of 70% by weight or more. A cured product of a paste made from the resin composition can be used to form a varistor element.

11 Claims, 2 Drawing Sheets

(56) References Cited

FOREIGN PATENT DOCUMENTS

| WO | 2011059769 A1 | 5/2011 |
| WO | 2011059771 A1 | 5/2011 |
| WO | 2011059798 A1 | 5/2011 |
| WO | 2011059806 A1 | 5/2011 |

* cited by examiner

RESIN COMPOSITION, PASTE FOR FORMING A VARISTOR ELEMENT, AND VARISTOR ELEMENT

CROSS-REFERENCE TO RELATED APPLICATION

This application is based on and claims the benefit under 35 USC 119(e) of U.S. Provisional Patent Application No. 62/443,340, filed Jan. 6, 2017.

FIELD OF THE INVENTION

The present invention relates to a resin composition which is used for producing a varistor element, a paste for forming a varistor element, and a varistor element.

BACKGROUND ART

A patent document 1, there is a description about a composition of a dielectric (VSD) material which is capable of being switched with a voltage, the composition having a binder and one or more types of particles dispersed in the binder, wherein the particles comprise core/shell particles in a certain concentration, each core/shell particle having a conductor core and shell, wherein the shell is (i) a multilayer and/or (ii) heterogeneous. Further, the patent document 1 describes that the one or more types of particles further comprise non-core/shell particles of carbon nanotubes.

In patent document 2, there is a description of an underfill composition which comprises (A) an epoxy resin, (B) a curing agent, and (C) a polyhedral oligomer silsesquioxane having at least one epoxy group, wherein the amounts of the components, in terms of a weight, satisfy the relationship: $0.05 \leq (C)/((A)+(B)+(C)) \leq 0.3$. In addition, the patent document 2 describes that the underfill composition further comprises (D) an inorganic filler in an amount of 30 to 70% by weight. Further, patent document 2 has a description that carbon nanotubes (single-walled carbon nanotubes and multi-walled carbon nanotubes) are used as inorganic filler (D).

PRIOR ART REFERENCES

Patent Documents

Patent document 1: JP 2012-504870 A
Patent document 2: JP 2013-504684 A

SUMMARY OF THE INVENTION

Problems to be Solved by the Invention

The varistor element is a device (electronic part) having properties such that, when a voltage between a pair of electrodes in the element is low, the electric resistance of the element is high, and, when a voltage between the electrodes becomes a predetermined value or more, the electric resistance is rapidly decreased. A varistor element generally has a structure in which a material having non-linear resistance characteristics is disposed between a pair of electrodes. Examples of materials having non-linear resistance characteristics include silicon carbide, zinc oxide, and strontium titanate.

For obtaining a varistor element having improved performance and reducing the cost for the varistor element, it is necessary to find and develop a new material for varistor element.

It is an object of the present invention to obtain a varistor element using a material which has not conventionally been known to have varistor characteristics, and having appropriate varistor characteristics, and a paste for forming a varistor element, which is used for producing the varistor element. It is another object of the present invention to obtain a resin composition which is used for producing the paste for forming a varistor element.

An object of the present invention is to obtain a resin composition which can produce a varistor element having appropriate varistor characteristics even when the resin composition has a simple composition which is, for example, free of a filler (fillerless).

Means for Solving the Problems

The present inventors have found that semiconducting single-walled carbon nanotubes can be used as a novel material for varistor element, which has not conventionally been known, and the present invention has been completed. Specifically, for solving the above-mentioned problems, the present invention has configurations as follows.

(Configuration 1)

Configuration 1 of the present invention is a resin composition which comprises (A) an epoxy resin, (B) a curing agent, and (C) carbon nanotubes, wherein the carbon nanotubes contain therein semiconducting single-walled carbon nanotubes in an amount of 70% by weight or more.

By using the resin composition according to configuration 1 of the present invention, a varistor element using semiconducting single-walled carbon nanotubes which are a novel material for varistor element, and having appropriate varistor characteristics can be produced.

(Configuration 2)

Configuration 2 of the present invention is the resin composition according to configuration 1, wherein (A) the epoxy resin comprises at least one member selected from a bisphenol A epoxy resin, a brominated bisphenol A epoxy resin, a bisphenol F epoxy resin, a biphenyl epoxy resin, a novolak epoxy resin, an alicyclic epoxy resin, a naphthalene epoxy resin, an ether epoxy resin, a polyether epoxy resin, a silicone epoxy copolymer resin and an aminophenol epoxy resin.

In configuration 2 of the present invention, the resin composition contains a predetermined epoxy resin, and therefore it is possible to produce a varistor element having advantageously cured the materials for the varistor element.

(Configuration 3)

Configuration 3 of the present invention is the resin composition according to configuration 1 or 2, wherein (B) the curing agent comprises an amine compound, a phenol, an acid anhydride, an imidazole compound, or a mixture thereof.

In configuration 3 of the present invention, the resin composition contains a predetermined curing agent, and therefore it is possible to advantageously cure the epoxy resin upon producing a varistor element.

(Configuration 4)

Configuration 4 of the present invention is the resin composition according to any one of configurations 1 to 3, which contains (C) the semiconducting single walled carbon nanotubes in an amount of 0.05 to 2% by weight, based on the weight of (A) the epoxy resin (100% by weight).

In configuration 4 of the present invention, the resin composition contains semiconducting single-walled carbon nanotubes in a predetermined amount, and therefore a varistor element having appropriate varistor characteristics can be obtained.

(Configuration 5)

Configuration 5 of the present invention is a paste for forming a varistor element, which comprises the resin composition according to any one of configurations 1 to 4.

By using the paste for forming a varistor element according to configuration 5 of the present invention, a varistor element having appropriate varistor characteristics can be produced.

(Configuration 6)

Configuration 6 of the present invention is a cured product which is obtained from the resin composition according to any one of configurations 1 to 4.

A varistor element using the cured product of resin composition according to configuration 6 of the present invention can have appropriate varistor characteristics.

(Configuration 7)

Configuration 7 of the present invention is a varistor element which comprises a cured product of the paste for forming a varistor element according to configuration 5 and an electrode.

According to configuration 7 of the present invention, a varistor element having appropriate varistor characteristics can be obtained.

Effects of the Invention

By the present invention, a novel varistor element using a new material which has not conventionally been known to have varistor characteristics, and having appropriate varistor characteristics can be obtained. Specifically, a varistor element containing semiconducting single-walled carbon nanotubes as a material therefor in a predetermined amount and having appropriate varistor characteristics can be obtained. Further, by the present invention, a paste for forming a varistor element, which is used for producing a varistor element having appropriate varistor characteristics, can be obtained. By the present invention, there can be obtained a resin composition for producing a paste for forming a varistor element, which paste is used for producing a novel varistor element having appropriate varistor characteristics.

By the present invention, there can be obtained a resin composition which can produce a varistor element having appropriate varistor characteristics even when the resin composition has a simple composition which is, for example, free of a filler (fillerless).

MODE FOR CARRYING OUT THE INVENTION

The resin composition of the present invention comprises (A) an epoxy resin, (B) a curing agent, and (C) carbon nanotubes. The resin composition of the present invention has a characteristic feature such that the weight percentage of semiconducting single-walled carbon nanotubes in the all carbon nanotubes contained in the resin composition is 70% by weight or more. By using the resin composition of the present invention, it is possible to produce a varistor element having appropriate varistor characteristics such that the varistor element can be suitably used.

Figure 1:
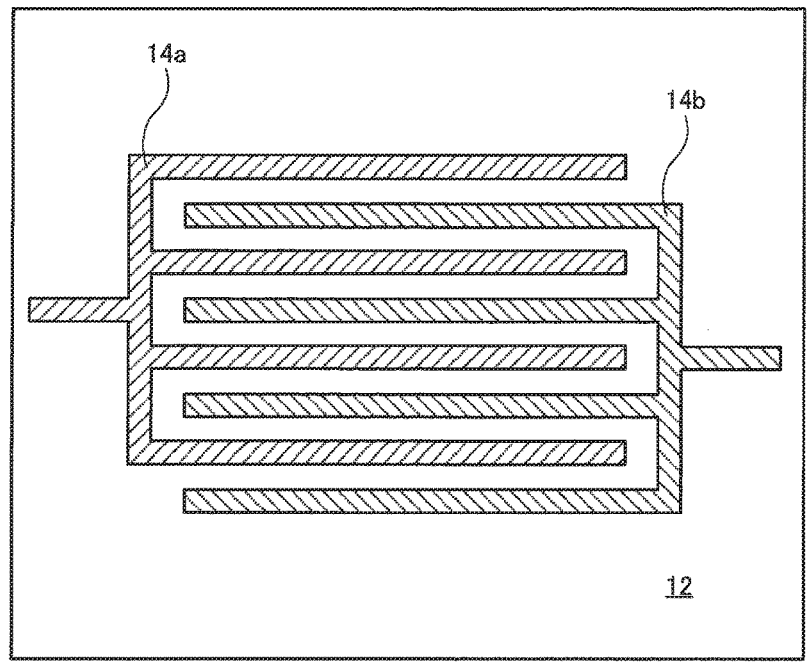
FIG. 1 is a schematic diagram of plan view of electrodes used in the varistor element used in the Examples of the present invention.
Figure 2:
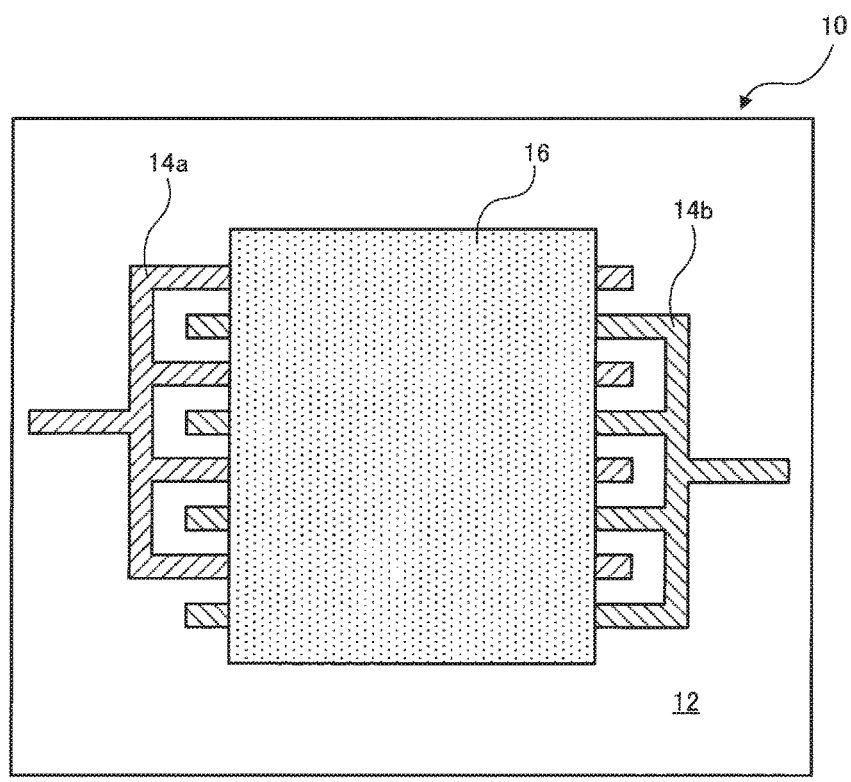
FIG. 2 is a schematic diagram of plan view of the varistor element used in the Examples of the present invention.

FIG. 2 shows a schematic diagram of an example of a varistor element. As shown in FIG. 2, the varistor element has a structure in which a material having varistor characteristics (for example, the resin composition of the present invention) is disposed on a pair of electrodes 14a and 14b shown in FIG. 1. The structure of the varistor element shown in FIG. 2 is merely an example of the structure, and any structure in which a material having varistor characteristics is disposed between a pair of electrodes can be employed. For example, a structure in which a material having varistor characteristics is disposed between electrodes which are arranged in parallel to each other with respect to their planes, or a structure in which a pair of electrodes are three-dimensionally arranged in a comb-like form can be employed for the varistor element.

The varistor element is an electronic device having non-linear resistance characteristics. The relationship between voltage V applied to a pair of electrodes 14a and 14b in the varistor element and current I between the both terminals at that time can be approximated by the equation: $I=K \cdot V^{\alpha}$, wherein K is constant. The $\alpha$ is a nonlinear coefficient. In the case of a general ohmic resistor, non-linear coefficient $\alpha$ is 1 ($\alpha=1$), but, in the case of a varistor element, non-linear coefficient $\alpha$ is more than 1 ($\alpha>1$). When a varistor element has non-linear coefficient $\alpha$ of 10 or more, the varistor element is considered to have appropriate varistor characteristics such that the varistor element can be suitably used.

By using the resin composition of the present invention, it is possible to produce a varistor element having appropriate varistor characteristics such that the varistor element can be suitably used, that is, a varistor element having non-linear coefficient $\alpha$ of 10 or more for the varistor element.

Hereinbelow, the resin composition of the present invention will be described in detail.

In the resin composition of the present invention, it is preferred that (A) epoxy resin comprises at least one member selected from a bisphenol A epoxy resin, a brominated bisphenol A epoxy resin, a bisphenol F epoxy resin, a biphenyl epoxy resin, a novolak epoxy resin, an alicyclic epoxy resin, a naphthalene epoxy resin, an ether epoxy resin, a polyether epoxy resin, a silicone epoxy copolymer resin and an aminophenol epoxy resin.

When the resin composition contains a predetermined epoxy resin, it is possible to produce a varistor element having advantageously cured the materials for the varistor element.

In the resin composition of the present invention, it is preferred that (B) curing agent comprises an amine compound, a phenol, an acid anhydride, an imidazole compound, or a mixture thereof. When the resin composition contains a predetermined curing agent, it is possible to advantageously cure the epoxy resin upon producing a varistor element.

With respect to (B) curing agent contained in the resin composition of the present invention, it is preferred that (B) curing agent comprises an imidazole. With respect to the imidazole compound, for example, imidazole or an imidazole derivative can be used. In the case of a varistor element containing semiconducting single-walled carbon nanotubes, when the curing agent comprises an imidazole compound, particularly imidazole, a varistor element having more excellent varistor characteristics, specifically, having high non-linear coefficient α can be obtained. Further, when the curing agent comprises both an imidazole compound (particularly imidazole) and an amine compound other than the imidazole compound, a varistor element having even high non-linear coefficient α can be obtained.

With respect to the amine compound other than the imidazole compound, one which is selected from an aliphatic amine, an alicyclic amine, an aromatic amine, 3,3'-diethyl-4,4'-diaminodiphenylmethane, and diethyltoluenediamine can be used. Particularly, with respect to the amine compound, 3,3'-diethyl-4,4'-diaminodiphenylmethane (which is commercially available under the trade name "KAYAHARD A-A" aromatic amine curing agent (manufactured by Nippon Kayakaku Co., Ltd.)) and/or diethyltoluenediamine (which is commercially available under the trade name "ETHACURE", manufactured by Albemarle Corporation) can be preferably used.

When (B) curing agent contained in the resin composition of the present invention comprises an imidazole compound, the weight percentage of the imidazole compound in the resin component is preferably 1 to 20% by weight, more preferably 2 to 15% by weight, further preferably 5 to 10% by weight. When the imidazole compound is incorporated in a predetermined amount, a varistor element having high non-linear coefficient α can be surely obtained.

The resin composition of the present invention comprises (C) semiconducting single-walled carbon nanotubes. When the total amount of the all carbon nanotubes contained in the resin composition of the present invention is 100% by weight, the content of the semiconducting single-walled carbon nanotubes in the all carbon nanotubes is 70% by weight or more. When the carbon nanotubes contained in the resin composition contain therein semiconducting single-walled carbon nanotubes in an amount of 70% by weight or more, a varistor element having appropriate varistor characteristics can be produced.

Carbon nanotubes are a material in the shape of coaxial tubes each formed from a network of 6-membered rings made of carbon. The carbon nanotubes include those of which the coaxial tube has a single-walled layer and those of which the coaxial tube has a multi-walled layer. Further, depending on the electric properties, the carbon nanotubes can be classified into metallic carbon nanotubes and semiconducting carbon nanotubes. It is difficult to separate the metallic carbon nanotubes and the semiconducting carbon nanotubes from each other from a technical point of view. However, in recent years, techniques for separating the metallic and semiconducting carbon nanotubes are being developed. Commercially available general single-walled carbon nanotubes contain metallic single-walled carbon nanotubes in a weight ratio of about 1/3 and semiconducting single-walled carbon nanotubes in a weight ratio of about 2/3.

The resin composition of the present invention contains semiconducting carbon nanotubes of a single-walled type (semiconducting single-walled carbon nanotubes). When the resin composition to be used as a material for varistor element contains semiconducting single-walled carbon nanotubes, a varistor element having appropriate varistor characteristics can be produced.

When the total amount of the all carbon nanotubes contained in the resin composition of the present invention is 100% by weight, the content of the semiconducting single-walled carbon nanotubes in the all carbon nanotubes is 70% by weight or more, and the content is preferably higher. That is, when the total amount of the all carbon nanotubes contained in the resin composition of the present invention is 100% by weight, the content of the semiconducting single-walled carbon nanotubes in the all carbon nanotubes is required to be at least 70% by weight or more, preferably 80% by weight or more, more preferably 90% by weight or more. When the carbon nanotubes contained in the resin composition contain therein semiconducting single-walled carbon nanotubes in a predetermined percentage, a varistor element having more excellent varistor characteristics (higher non-linear coefficient α) can be obtained. Further, the resin composition of the present invention can contain substantially only semiconducting single-walled carbon nanotubes. For example, semiconducting single-walled carbon nanotubes can constitute 99% by weight or more of the all carbon nanotubes contained in the resin composition of the present invention. Further, the upper limit of the range of the weight percentage of the semiconducting single-walled carbon nanotubes in the all carbon nanotubes may be 100% by weight.

The resin composition of the present invention preferably contains (C) semiconducting single-walled carbon nanotubes in an amount of 0.05 to 2% by weight, more preferably 0.1 to 1% by weight, further preferably 0.12 to 0.6% by weight, based on the weight of (A) epoxy resin (100% by weight). When the resin composition contains the semiconducting single-walled carbon nanotubes in a predetermined amount, a varistor element having appropriate varistor characteristics can be obtained.

It is preferred that each of the resin composition of the present invention and the below-mentioned paste for forming a varistor element does not contain an inorganic component (such as a filler) other than the semiconducting single-walled carbon nanotubes, that is, each of the resin composition and the paste is free of a filler (fillerless). By using the resin composition of the present invention, a varistor element having appropriate varistor characteristics can be produced even when the resin composition or the paste for forming a varistor element has a simple composition which is free of an inorganic component, such as a filler.

The present invention is directed to a paste for forming a varistor element, which comprises the above-mentioned resin composition of the present invention. The resin composition of the present invention as such can be used as a paste for forming a varistor element. However, from the viewpoint of facilitating the application of the paste, for example, upon screen printing, the paste for forming a varistor element can further comprise a solvent and other additives.

The paste for forming a varistor element of the present invention can further comprise a solvent. Examples of solvents include aromatic hydrocarbons, such as toluene and xylene; ketones, such as methyl ethyl ketone, methyl isobutyl ketone, and cyclohexanone; ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether, propylene glycol monobutyl ether, and esters, e.g., acetic acid esters corresponding to the above ethers; and terpineol. It is preferred that the solvent is incorporated in an amount of 2 to 10 parts by weight, relative to 100 parts by weight of the above-mentioned resin composition (the total of the epoxy resin, curing agent, and carbon nanotubes).

The paste for forming a varistor element of the present invention can further comprise at least one member selected from the group consisting of a coloring agent, such as an inorganic pigment or art organic pigment, an ion-trapping agent, a flame retardant, a silane coupling agent, a leveling agent, a thixotropic agent, an elastomer, a curing accelerator, a metal complex, a dispersant, and an anti-foaming agent.

The paste for forming a varistor element of the present invention can be produced by charging the above-mentioned (A) epoxy resin, (B) curing agent, and predetermined carbon nanotubes (C) and optionally other components, such as a solvent, into a mixing machine, such as a planetary stirring machine, a dissolver, a bead mill, a Raikai mixer, a three-roll mill, a rotary mixer, or a twin-screw mixer, and mixing the materials with one another. Thus, a resin composition advantageously used for producing a varistor element can be produced. From the paste for forming a varistor element of the present invention, a paste for forming a varistor element having a viscosity suitable for screen printing, immersion, or other desired methods for forming a film or wiring can be prepared.

Further, the present invention is directed to a cured product of the above-mentioned resin composition. The paste for forming a varistor element of the present invention is applied so as to be in contact with predetermined electrodes, and cured, so that a varistor element having appropriate varistor characteristics can be produced. Examples of application methods include screen printing and immersion.

The present invention is directed to a varistor element which comprises a cured product of the above-mentioned paste for forming a varistor element and an electrode. By the present invention, a varistor element having appropriate varistor characteristics can be obtained.

Examples

Hereinbelow, the present invention will be described in more detail with reference to the following Examples, which should not be construed as limiting the scope of the present invention.

<Materials for a Resin Composition and Formulation>

The materials used in the respective resin compositions in the Examples and Comparative Examples are as shown below. Tables 1 to 3 show respective formulations for the materials in the Examples and Comparative Examples.

(A) Epoxy Resin

In the resin compositions in the Examples and Comparative Examples, the below-described epoxy resin A, epoxy resin B, and epoxy resin C were used in the respective amounts shown in Tables 1 to 3.

Epoxy resin A is an epoxy resin which is obtained by mixing together the below-mentioned epoxy resin B (bisphenol F epoxy resin) (60% by weight) and a bisphenol A epoxy resin ("jER1001", manufactured by Mitsubishi Chemical Corporation) (40% by weight).

Epoxy resin B is a bisphenol F epoxy resin ("YDF-8170", manufactured by Nippon Steel & Sumikin Chemical Co., Ltd.).

Epoxy resin C is a liquid amine epoxy ("jER630", manufactured by Mitsubishi Chemical Corporation).

(B) Curing Agent

In the resin compositions in the Examples and Comparative Examples, with respect to the curing agent, an amine curing agent, an imidazole curing agent, a phenol and/or an acid anhydride were used in the respective amounts shown in Tables 1 to 3.

With respect to the amine curing agent, "KAYAHARD A-A (HDAA)" (3,3'-diethyl-4,4'-diaminodiphenylmethane), manufactured by Nippon Kayaku Co., Ltd., was used.

With respect to the imidazole curing agent, "2P4MHZ-PW", manufactured by Shikoku Chemicals Corporation, was used.

With respect to the phenol as a curing agent, "MEH-8005", manufactured by Meiwa Plastic Industries, Ltd., was used.

With respect to the acid anhydride as a curing agent, "YH307", manufactured by Mitsubishi Chemical Corporation, was used.

(C) Carbon Material (Carbon Nanotubes or Carbon Black)

In the resin compositions in the Examples and Comparative Examples, carbon materials (carbon nanotubes or carbon black) were used in the respective amounts shown in Tables 1 to 3.

With respect to carbon nanotubes A, semiconducting single-walled carbon nanotubes ("IsoNanotubes-S", manufactured by NanoIntegris Inc.) were used. In "IsoNanotubes-S", metallic single-walled carbon nanotubes are contained in an amount corresponding to the limit of detection or less, and semiconducting single-walled carbon nanotubes are contained in an amount of more than 99% by weight.

With respect to carbon nanotubes B, single-wailed carbon nanotubes ("PD1.5L15-S", manufactured by NANOLAB Inc.) were used. In. "PD1.5L15-S", the weight percentage of metallic single-walled carbon nanotubes is 33.3% by weight, and the weight percentage of semiconducting single-walled carbon nanotubes is 66.7% by weight.

With respect to carbon nanotubes C, multi-walled carbon nanotubes ("PD15L1-5", manufactured by NANOLAB Inc.) were used. Generally, multi-walled carbon nanotubes have properties of metallic carbon nanotubes. Therefore, the multi-walled carbon nanotubes used ("PD15L1-5", manufactured by NANOLAB Inc.) were regarded as metallic carbon nanotubes.

With respect to the carbon black, "EC600JD", manufactured by Lion Specialty Chemicals Co., Ltd., was used.

A weight percentage (%©) of the semiconducting single-walled carbon nanotubes in the all carbon nanotubes contained in the resin composition in each of the Examples and Comparative Examples was determined and shown in Tables 1 to 3.

Then, the materials in the above-mentioned predetermined formulation were mixed using a planetary mixer, and further dispersed using a three-roll mill so as to form a paste, producing a paste for forming a varistor element.

<Preparation of a Varistor Element>

Substrate 12 having electrodes 14a and 14b in a comb-like form as shown in FIG. 1 was used. With respect to the substrate, a multilayer printed wiring board (having a copper foil) using FR-4 as a material was used. The copper foil in the multilayer printed wiring board was subjected to patterning to form electrodes 14a and 14b.

Then, as shown in FIG. 2, each of the resin compositions in the Examples and Comparative Examples produced as mentioned above was subjected to screen printing so as to cover electrodes 14a and 14b formed in a comb-like form on the surface of substrate 12, followed by curing the epoxy resin. The epoxy resin was cured by maintaining it at a temperature of 165° C. for 2 hours. With respect to the all resin compositions, the cured epoxy resin had a thickness of 90 μm. Thus, varistor elements in the Examples and Comparative Examples were prepared.

<Measurement of Current-Voltage Characteristics of a Varistor Element and Determination of Non-Linear Coefficient α>

Figure 3:
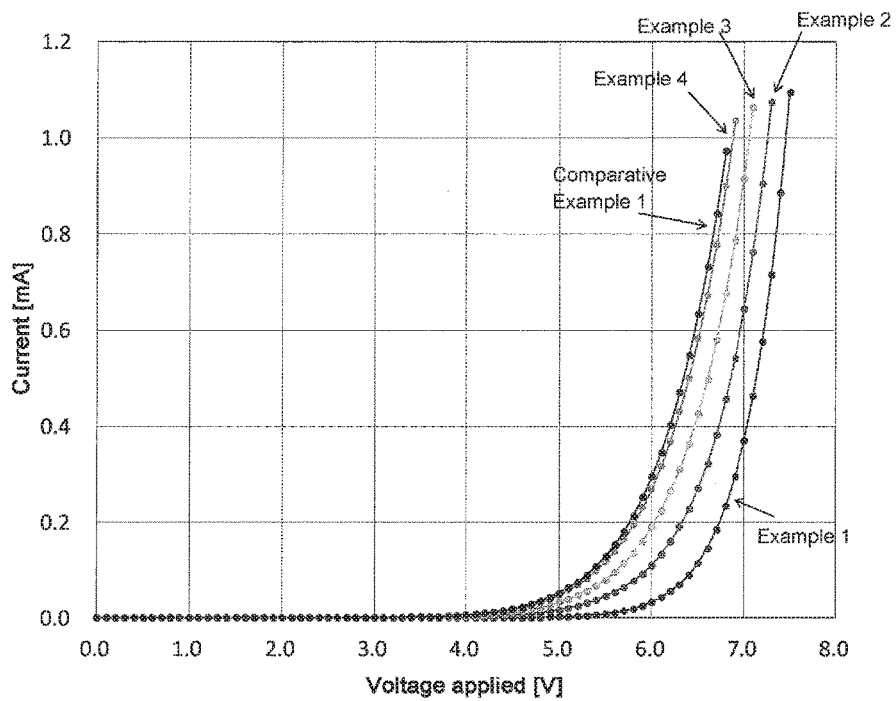
FIG. 3 is a graph showing the results of the measurement of current-voltage characteristics of the varistor elements of Examples 1 to 4 of the present invention and Comparative Example 1.
Figure 4:
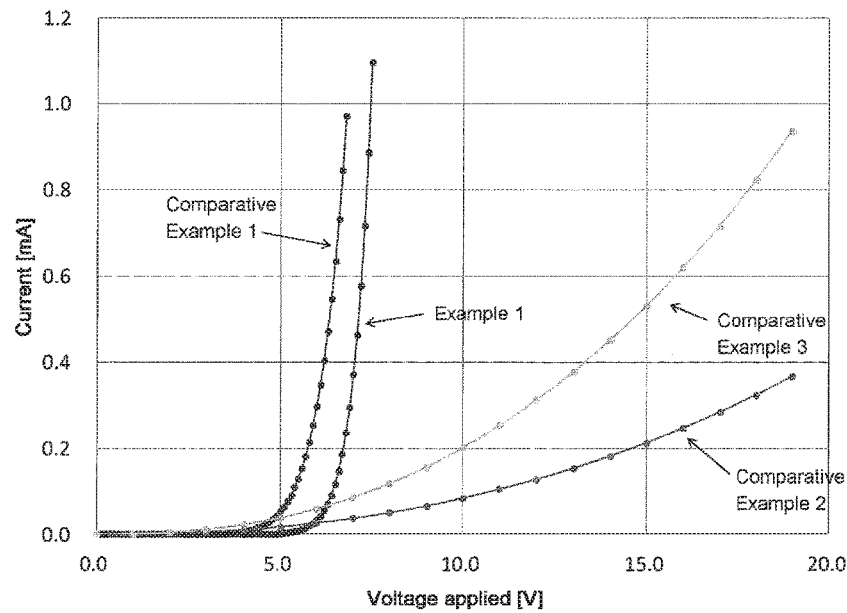
FIG. 4 is a graph showing the results of the measurement of current-voltage characteristics of the varistor elements of Example 1 of the present invention and Comparative Examples 1 to 3.

With respect to each of the above-prepared varistor elements in the Examples and Comparative Examples, current-voltage characteristics were measured. Specifically, current-voltage characteristics of a varistor element were measured by applying a predetermined voltage to a pair of electrodes (electrode 14a and electrode 14b) in the varistor element and measuring a value of a current of the element at that time. FIGS. 3 and 4 show examples of the results of the measurement of current-voltage characteristics with respect to the varistor elements.

<Determination of Non-Linear Coefficient α>

The current-voltage characteristics of a varistor element can be approximated by the equation: $I=K \cdot V^\alpha$, wherein K is a constant and α is a non-linear coefficient. From the current-voltage characteristics of the varistor element, non-linear coefficient α was determined by fitting. The results of the determination of non-linear coefficient α with respect to the varistor elements obtained in the Examples and Comparative Examples are shown in Tables 1 to 3. When a varistor element has non-linear coefficient α of 10 or more, the varistor element is considered to have appropriate varistor characteristics such that the varistor element can be suitably used.

As is apparent from Tables 1 to 3, in all of Examples 1 to 12 of the present invention, non-linear coefficient α is 10 or more. These results show that, by using the resin composition of the present invention in which the carbon nanotubes contain therein semiconducting single-walled carbon nanotubes in an amount of 70% by weight or more, it is possible to produce a varistor element having appropriate varistor characteristics such that the varistor element can be suitably used. Further, as apparent from the results of Example 4, when the carbon nanotubes in the resin composition contain therein semiconducting single-walled carbon nanotubes in an amount of 70% by weight, non-linear coefficient α is 10.1, so that appropriate varistor characteristics can be achieved. From the above, it is apparent that when the carbon nanotubes in the resin composition contain therein semiconducting single-walled carbon nanotubes in an amount of 70% by weight or more, appropriate varistor characteristics can be surely achieved.

In contrast, in all of Comparative Examples 1 to 3 in which the carbon nanotubes in the resin composition contain no semiconducting single-walled carbon nanotubes or contain semiconducting single-walled carbon nanotubes in an amount of less than 70% by weight, non-linear coefficient α was less than 10. From the above, it is apparent that, for achieving appropriate varistor characteristics, the resin composition has the requirement that the carbon nanotubes contain therein semiconducting single-walled carbon nanotubes in an amount of at least about 70% by weight.

TABLE 1

| | | Example 1 | Example 2 | Example 3 | Example 4 | Example 5 |
|---|---|---|---|---|---|---|
| Resin (Parts by weight) | Epoxy resin A | 70.39 | 70.39 | 70.39 | 70.39 | 75.73 |
| | Epoxy resin B | | | | | |
| | Epoxy resin C | | | | | |
| | Amine curing agent | 22.57 | 22.57 | 22.57 | 22.57 | 24.29 |
| | Imidazole curing agent | 7.04 | 7.04 | 7.04 | 7.04 | |
| | — | | | | | |
| | Total | 100 | 100 | 100 | 100 | 100 |
| Additive (Part by weight) | Carbon nanotubes A | 0.12 | 0.084 | 0.048 | 0.012 | 0.12 |
| | Carbon nanotubes B | | 0.036 | 0.072 | 0.108 | |
| | Carbon nanotubes C | | | | | |
| | Carbon black | | | | | |
| Weight percentage (%) of semiconducting single-walled carbon nanotubes in all carbon nanotubes | | 100 | 90 | 80 | 70 | 100 |
| Non-linear coefficient α | | 15.7 | 13.8 | 12 | 10.1 | 11.2 |

TABLE 2

| | | Example 6 | Example 7 | Example 8 | Example 9 | Example 10 |
|---|---|---|---|---|---|---|
| Resin (Parts by weight) | Epoxy resin A | 90.91 | 58.06 | | | 70.39 |
| | Epoxy resin B | | | 65.08 | | |
| | Epoxy resin C | | | | 55.05 | |
| | Amine curing agent | | | 28.41 | 39.44 | 22.57 |
| | Imidazole curing agent | 9.09 | 5.81 | 6.51 | 5.51 | 7.04 |
| | Phenol | | 36.13 | | | |
| | Total | 100 | 100 | 100 | 100 | 100 |
| Additive (Parts by weight) | Carbon nanotubes A | 0.12 | 0.12 | 0.12 | 0.12 | 0.24 |
| | Carbon nanotubes B | | | | | |
| | Carbon nanotubes C | | | | | |
| | Carbon black | | | | | |
| Weight percentage (%) of semiconducting single-walled carbon nanotubes in all carbon nanotubes | | 100 | 100 | 100 | 100 | 100 |
| Non-linear coefficient α | | 14.9 | 13.2 | 17.7 | 17 | 18 |

TABLE 3

| | | Example 11 | Example 12 | Comparative Example 1 | Comparative Example 2 | Comparative Example 3 |
|---|---|---|---|---|---|---|
| Resin (Parts by weight) | Epoxy resin A | 70.39 | 63.15 | 70.39 | 70.39 | 70.39 |
| | Epoxy resin B | | | | | |
| | Epoxy resin C | | | | | |
| | Amine curing agent | 22.57 | 6.31 | 22.57 | 22.57 | 22.57 |
| | Imidazole curing agent | 7.04 | | 7.04 | 7.04 | 7.04 |
| | Acid anhydride | | 30.54 | | | |
| | Total | 100 | 100 | 100 | 100 | 100 |
| Additive (Parts by weight) | Carbon nanotubes A | 0.6 | 0.12 | | | |
| | Carbon nanotubes B | | | 0.12 | | |
| | Carbon nanotubes C | | | | 0.12 | |
| | Carbon black | | | | | 0.24 |
| Weight percentage (%) of semiconducting single-walled carbon nanotubes in all carbon nanotubes | | 100 | 100 | 67 | 0 | — |
| Non-linear coefficient α | | 21 | 15.4 | 9.5 | 2.3 | 2.4 |

DESCRIPTION OF THE REFERENCE NUMERALS

10: Varistor element
12: Substrate
14a; 14b: Electrode
16: Resin composition

The invention claimed is:

1. A resin composition comprising:
(A) an epoxy resin;
(B) a curing agent; and
(C) carbon nanotubes,
wherein the carbon nanotubes contain therein semiconducting single-walled carbon nanotubes in an amount of 70% by weight or more.

2. The resin composition according to claim 1, wherein the epoxy resin (A) comprises at least one member selected from the group consisting of a bisphenol A epoxy resin, a brominated bisphenol A epoxy resin, a bisphenol F epoxy resin, a biphenyl epoxy resin, a novolak epoxy resin, an alicyclic epoxy resin, a naphthalene epoxy resin, an ether epoxy resin, a polyether epoxy resin, a silicone epoxy copolymer resin and an aminophenol epoxy resin.

3. The resin composition according to claim 1, wherein the curing agent (B) comprises an amine compound, a phenol, an acid anhydride, an imidazole compound, or a mixture thereof.

4. The resin composition according to claim 1, wherein the semiconducting single-walled carbon nanotubes are contained in an amount of 0.05 to 2% by weight, based on the weight of the epoxy resin (A) being 100% by weight.

5. A paste for forming a varistor element, wherein the paste comprises the resin composition according to claim 1.

6. A cured product obtained from the resin composition according to claim 1.

7. A varistor element comprising:
the cured product according to claim 6; and an electrode.

8. The resin composition according to claim 1, wherein the resin composition does not contain an inorganic component other than the carbon nanotubes.

9. The resin composition according to claim 1, wherein the resin composition does not contain an inorganic component other than the semiconducting single-walled carbon nanotubes.

10. The resin composition according to claim 1, wherein the semiconducting single-walled carbon nanotubes are contained in an amount of 0.1 to 1% by weight, based on the weight of the epoxy resin (A) being 100% by weight.

11. The resin composition according to claim 1, wherein the curing agent (B) comprises an imidazole compound, and the weight percentage of the imidazole compound in the resin component is 1 to 20% by weight.

* * * * *